United States Patent [19]
Nakane et al.

[11] Patent Number: 5,946,285
[45] Date of Patent: *Aug. 31, 1999

[54] OPTICAL DISK HAVING A CONTINUOUS INFORMATION TRACK FORMED OF ALTERNATING LAND AND GROOVE TRACK REVOLUTIONS AND A METHOD OF TRACKING THE OPTICAL DISK

[75] Inventors: Kazuhiko Nakane; Masato Nagasawa; Hiroyuki Ohata; Masayoshi Shimamoto; Kouichi Komawaki; Kenji Gotoh; Yoshinobu Ishida, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,534

[22] Filed: Feb. 28, 1997

[30] Foreign Application Priority Data

Jun. 24, 1996  [JP]  Japan .................................. 7-163077

[51] Int. Cl.$^6$ ............................................ G11B 7/08
[52] U.S. Cl. ............................................ 369/275.3
[58] Field of Search ........................... 369/275.1, 275.2, 369/275.3, 275.4, 32, 44.26

[56] References Cited

U.S. PATENT DOCUMENTS

| | | | |
|---|---|---|---|
| 5,444,682 | 8/1995 | Yamada et al. | 369/44.26 |
| 5,508,995 | 4/1996 | Moriya et al. | 369/275.4 |
| 5,508,996 | 4/1996 | Endoh | 369/275.4 |
| 5,616,390 | 4/1997 | Miyagawa et al. | 369/275.4 |
| 5,638,354 | 6/1997 | Nakayama et al. | 369/275.4 |
| 5,673,250 | 9/1997 | Mieda et al. | 369/275.4 |
| 5,724,338 | 3/1998 | Birukawa et al. | 369/275.3 |
| 5,754,506 | 5/1998 | Nagasawa et al. | 369/275.2 |

FOREIGN PATENT DOCUMENTS

| | | |
|---|---|---|
| 0757343A1 | 8/1996 | European Pat. Off. . |
| 63-57859 | 11/1988 | Japan . |
| 438633 | 2/1992 | Japan . |
| 6176404 | 6/1994 | Japan . |
| 6274896 | 9/1994 | Japan . |
| 7-57302 | 3/1995 | Japan . |
| 7110944 | 4/1995 | Japan . |
| 7141701 | 6/1995 | Japan . |
| 822621 | 1/1996 | Japan . |
| 887777 | 4/1996 | Japan . |

OTHER PUBLICATIONS

Miyagawa, et al., "Land and Groove Recording for High Density on Phase–Change Optical Disks", Japanese Journal of Applied Physics, vol. 32, No. 11B, Nov., 1993.

"Development of Disc Format for Digital Video Disc Recorder (DVD/R)", *ITE Technical Report,* vol. 18, No. 72, pp. 95–100, (Nov. 1994).

*Primary Examiner*—Nabil Hindi

[57] ABSTRACT

In optical disk having a track formed of groove tracks and land tracks connected every revolution to form a single spiral, each revolution-of the tracks is divided into sectors, each having identification signal region at the head of the sector, and the identification signal regions in tracks adjacent to each other are aligned in the radial direction. Prepits are formed in the identification signal region, on an extension of a boundary between groove and land tracks adjacent to each other. The prepits have a width substantially equal to the width of the grooves. The identification signal including address information of the sector. The polarity of tracking error signal is detected at the identification signal region of the recording sector, and whether the recording sector is in a groove track or land track is determined based on the polarity of tracking error signal. The identification signal may include information concerning the timing for switching tracking polarity in accordance with whether groove or land sector is being scanned.

11 Claims, 5 Drawing Sheets

OPTICAL DISK HAVING A CONTINUOUS INFORMATION TRACK FORMED OF ALTERNATING LAND AND GROOVE TRACK REVOLUTIONS AND A METHOD OF TRACKING THE OPTICAL DISK

BACKGROUND OF THE INVENTION

The present invention relates to an optical disk in which signals are recorded op both of groove tracks and land tracks formed between groove tracks, and a method of tracking such an optical disk.

Technical developments for large-capacity read-only optical disks indicate that they will be widely used as digital video disks and computer data ROM disk. Also, the density of rewritable optical disks is steadily increasing in 12 cm diameter rewritable optical disks which currently have a capacity 4 times that of conventional CDs (compact dics), therefore realization of a large-capacity disk of 2.6 GB per side is drawing near.

The technology for increasing recording density of rewritable disks will be described first. Currently, the land/groove (L/G) recording format is being studied as one of the rewritable optical disk signal recording formats. FIG. 3 shows the structure of inscribed land/groove tracks for conventional optical disks. As disclosed in Japanese Examined Patent Publication No. 63-57859, the recording pits (recording marks) are formed both in grooves 94 formed in the record layer 91, and lands 95 between the grooves 94. Numeral 93 denotes a light spot for recording and reproducing information signal.

Compared with conventional optical disks in which recording pits are formed in the grooves 94 only, the L/G recording configuration can record twice the data, the track pitch can be halved when a disk of the same groove pitch as conventional optical disks is used. In addition, in enhancing the density of optical disks, the L/G recording configuration has the following advantages.

First, the groove width is substantially equal to that of conventional optical disks, and the servo error signal can be picked up as a high fidelity signal as in continuous groove tracking or continuous land tracking, so reliability of apparatus operation increase. Secondly, as described in "Land and Groove Recording for High Track Density on Phase-Change Optical Disks" by N. Miyagawa, et al. (Jpn-J-Appl. Phys., vol. 32, pp. 5324–5328, 1993), by taking advantage of reduced crosstalk resulting from an optimized groove depth, a narrower recording track pitch is achieved. However, problems associated with L/G recorded optical disks are that the tracking polarity must be switched between groove and land during tracking, and an additional circuit is needed for jumping during tracking. These problems, however, can be overcome by a minor change in the conventional tracking circuit for continuous groove tracking.

One unsolved problem for the L/G recording is a track format which allows the groove track data and land track data to be joined so as to enable continuous access. A track format suitable for continuous access is essential for video disks, while at the same time the high-speed random access of data disk files must also be supported.

Two specific examples of track formats for L/G recording are given below.

FIG. 4 shows a general configuration of track format having groove and land tracks connected every revolution to form a single recording spiral. The black region G shows groove tracks and the white region L shows the land tracks. This format is disclosed in Japanese Laid-Open Patent Publications No. 4-38633, No. 6-274896, No. 8-87777. The optical disk format of FIG. 4 will be called the single-spiral land/groove (SS-L/G) format in the present specification.

FIG. 5 shows the general configuration of another track format for conventional L/G recording format consisting of two separate recording spirals of the groove and land tracks. This recording format is known as a double spiral land/groove (DS-L/G) format. In both of the cases shown in FIG. 4 and FIG. 5, the disk configured in an aligned ID format in which tracks are divided into sectors (eight sectors in the example illustrated), each consisting of an information recording region D and an identification signal region I, for recording the address information of each sector. The identification signal regions are aligned in the radial direction. This configuration prevents crosstalk from the identification signals in the neighboring tracks during playback of information from the information recording region D (which would occur if the information recording region and the identification signal region I are adjacent to each other).

As shown in FIG. 4 for the SS-L/G format, there is a point at one location per revolution, where groove and land tracks are connected at the identification signal region IB.

Next, L/G recording track formats of FIG. 4 and FIG. 5 are compared.

The SS-L/G recording track format shown in FIG. 4 possesses a merit that the recording track is one continuous line on the disk which allows for continuous recording/reproduction of data and the radial access method similar to that of conventional CDs is applicable since data is sequentially arranged on a spiral. Furthermore, this formation is suitable for optical disk track formats of video files where continuous recording/reproducing capabilities are an indispensable requirement. For the conventional DS-L/G format shown in FIG. 5, land and groove tracks separately form independent spirals. A special track jump method is required to handle optical head transition from, for example, the end of the land track after one scan of the entire spiral to the start of the groove track. So, continuous recording/reproduction must be interrupted in at least one place due to connecting access between the land and track grooves. To avoid this interruption, a buffer memory may be added, but this raises the cost of related equipment. For the SS-L/G format, this buffer memory is not necessary.

However, as mentioned previously, the connecting point between groove and land recording tracks must be detected in order to determine whether to scan on a groove track or a land track, and the polarity of the tracking servo must be switched. That is, the tracking servo polarity must be switched correctly for every disk revolution. The L/G switching region detection is difficult, and accurate tracking control for data recording/reproduction has not been possible. For this reason, the SS-L/G format of the optical disk has not successfully been put into practical use.

Next, the prior identification signal insertion method of the DS-L/G recording format of the optical disk as shown in FIG. 5 will be described. Three methods of configuring the prepits in the identification signal region shown in FIGS. 6A to 6C are currently known. In FIGS. 6A to 6C, I is the identification signal region and D is the information recording region. The method shown in FIG. 6A is called the land/groove independent address method. Dedicated prepits are included for each sector of the land track and the groove track. For this format, if the identification signal pit width and groove width are the same, the prepits of the adjoined track sectors are connected and the signal cannot be detected. Therefore, the identification signal pit width and groove width must be different, and usually, the prepit width is half that of the groove.

However, for mastering process of mother stamper in disk fabrication, the cutting beam diameter must be changed to form grooves and to form prepits. More-specifically, a narrow prepit width means that two beams must be employed for cutting the mother stamper in mastering, one for groove cutting and one for pit cutting. Also, if the two beam centers are not aligned, a tracking offset will occur between reproduction of identification signal and recording/reproducing of information recording signal. This tracking offset degrades the quality of the playback data. To ensure reliability of the playback data, a highly accurate positioning of the two beams is required during original disk fabrication, which increases disk costs.

In view of disk production accuracy and cost, the format shown in FIG. 6B and FIG. 6C in which the same beam can be used for grooves and pits is preferred over the format shown in FIG. 6A. In the format shown in FIGS. 6B and 6C, the width of the prepits forming the identification signal is substantially equal to the width as the grooves.

The method shown in FIG. 6B is called the land/groove >shared address format. The prepits are placed on an extension of a boundary between a given pair of adjacent groove and land tracks, so each track shares the same identification signal. Details are disclosed in Japanese Laid-Open Patent Publication No. 6-176404.

FIG. 6C shows the time-division L/G independent address format as disclosed in Japanese Laid-Open Patent Publication No. 7-110944. An identification signal is included as address information independently for each of the land and groove tracks. For this format, the identification signals in the header section in tracks adjacent to each other are shifted in the direction of the tracks, so the identification signals in the adjacent tracks are not aligned in the radial direction. A drawback of this format is a low efficiency of the sector format due to the double length of identification signal regions.

Next, the rotation control method of the L/G record optical disk is described.

For optical disk track formats of video files where continuous recording/reproducing capabilities are indispensable, the rotational speed of the disk is changed so that the data rate is identical between inner and outer peripheries of the disk. Also, for rewritable optical disk, compatibility with conventional read-only optical disk is important, so use of phase change mediums is preferable. For this recording format, the disk recording layer is heated and changed by the light from crystalline phase to amorphous phase, and recording marks are thereby formed. The optical head for phase-change recording can be easily shared by the optical head for a read-only optical disk.

However, current phase-change mediums do not have sufficient recording/reproduction capabilities. Because the adaptable range of recording linear velocity during pulse width modulation (PWM) recording is narrow, the achievable recording/reproducing characteristic is not satisfactory. A detailed description of the recording/reproducing characteristics is given as follows. When the disk rotational speed is controlled in CAV (Constant Angular Velocity) control mode, and if the disk rotational speed is fixed to yield the required data rate for inner radial part of the disk, the recording linear velocity of outer radial part of the disk will be 2.5 to 3.0 times faster than that of inner radial part. Accordingly, the signal processing circuit must process data in the outer radial part at nearly 3 times higher than the data rate of in the inner radial part. Designing a low cost recording/reproducing apparatus which accommodates such a wide recording speed range is difficult. Moreover, for video applications, a constant data rate for inner and outer circumferences of the disk is desirable.

A solution is as follows. For a rewritable digital video disk having compatibility with ROM, requirements for disk media characteristics and data record/reproduction circuit performance call for employment of a ZCLV (Zoned Constant Linear Velocity) format. The ZCLV is a recording/reproducing format where the optical disk is divided into multiple annular zones, and the disk rotational speed is changed depending on the zones, so that the data transfer rate can be fixed and the linear velocity is substantially constant in all the zones. However, a problem with the rotation control system for an optical disk where the disk rotational speed changes is that the quick and correct detection of the groove-land connecting point is difficult because the periods between the groove-land connecting points vary during radial seek operation crossing zone boundaries.

As has been described, for rewritable optical disks employing conventional single-spiral L/G recording formats, it is difficult to achieve quick and correct detection of the land-groove connecting point, and a high level of reliability, while maintaining the recording density.

SUMMARY OF THE INVENTION

It is accordingly an object of the present invention to provide a single spiral land/groove format optical disk which allows easy and consistent detection of the connecting point between land and groove tracks, and switching of the polarity of the tracking servo, without lowering the effective recording density.

Another object of the present invention is provide a tracking method for driving the above recited disk.

An optical disk according to the invention has a track formed by groove tracks and by land tracks between the groove tracks both of which form an information recording region, the information recording region allowing an information signal to be recorded through illumination by a light beam, causing local change in the optical characteristics, the optical disk having groove and land tracks alternately connected at every revolution to form a continuous spiral in which land and groove tracks alternate at every revolution, each revolution of the tracks being divided into sectors, each having a identification signal region at the head of the sector, the identification signal regions in tracks adjacent to each other being aligned in the radial direction, prepits being formed in the identification signal region, on an extension of a boundary between groove and land tracks adjacent to each other, the prepits having a width substantially equal to the width of the grooves, the identification signal including sector address information.

With the above configuration, on the basis of the position of (or the displacement direction of) the identification signal, the tracking polarity can be detected consistently and the land/groove connecting point can also be detected consistently. An alternative is to detect the tracking polarity on the basis of the information concerning the timing for switching the tracking polarity, contained in the identification signal. As a result, a stable tracking is ensured, and a single spiral L/G recording format can be used in practice.

DETAILED DESCRIPTION OF THE PREFERRED EMBODIMENTS

Figure 1:
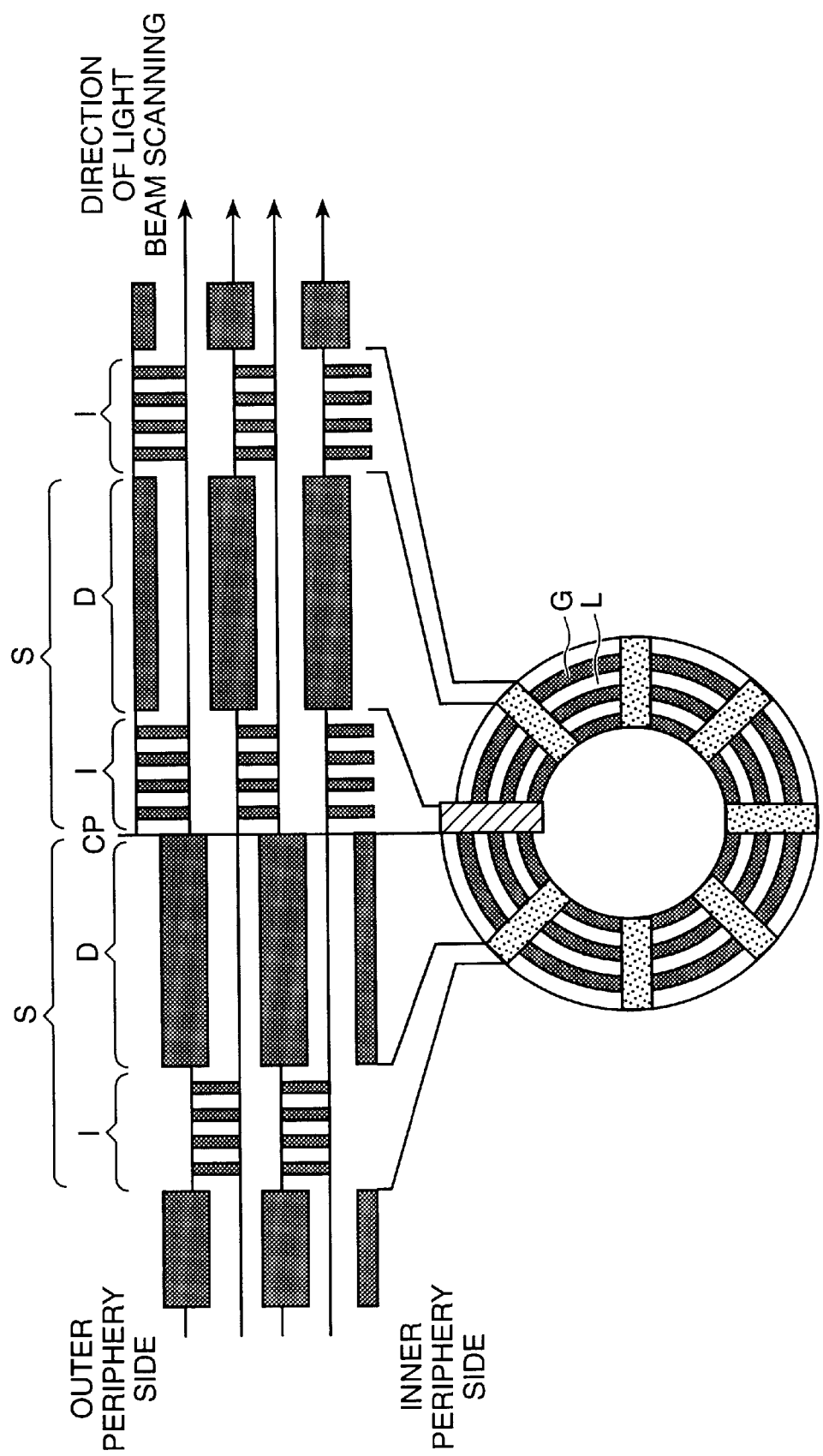
FIG. 1 is the track layout of the optical disk according to the present invention.
Figure 2:
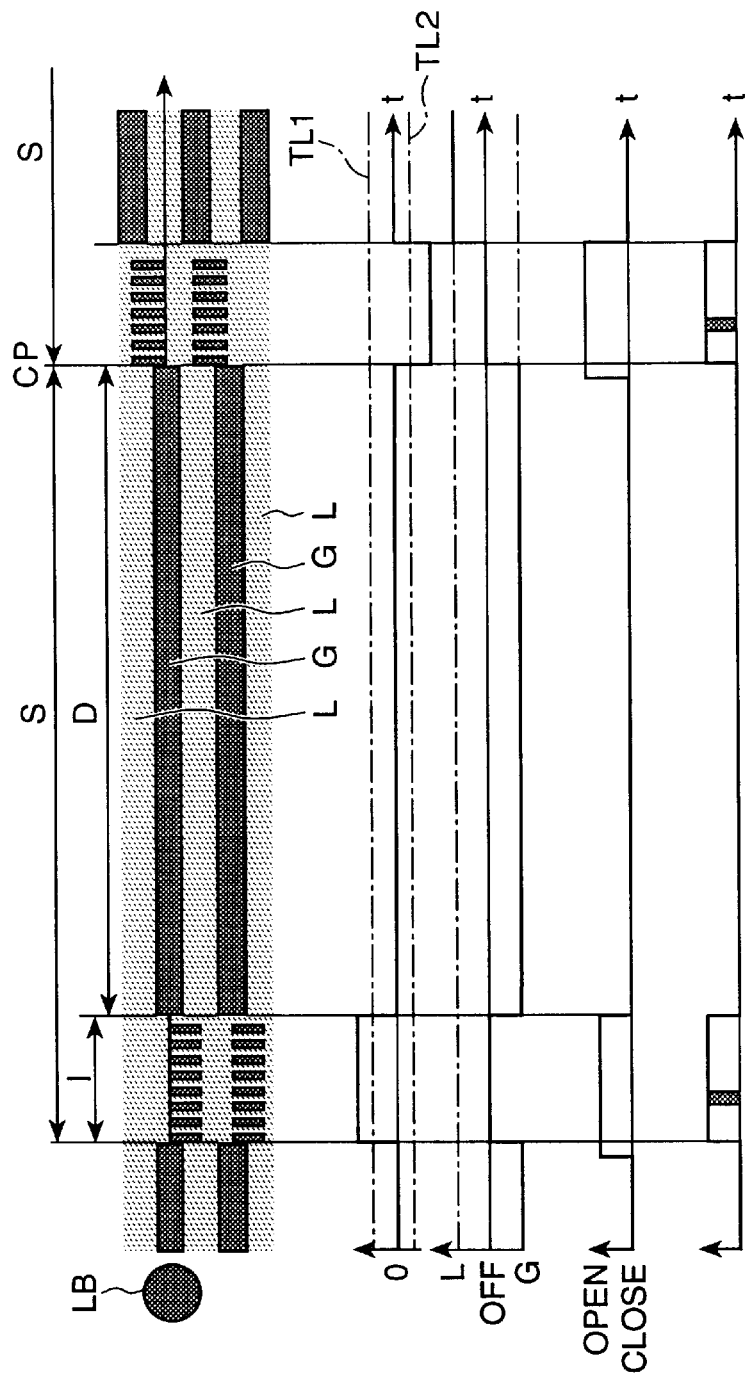
FIGS. 2A to 2E are timing diagrams illustrating the method of recognition of the tracking polarity according to the present invention.
Figure 3:
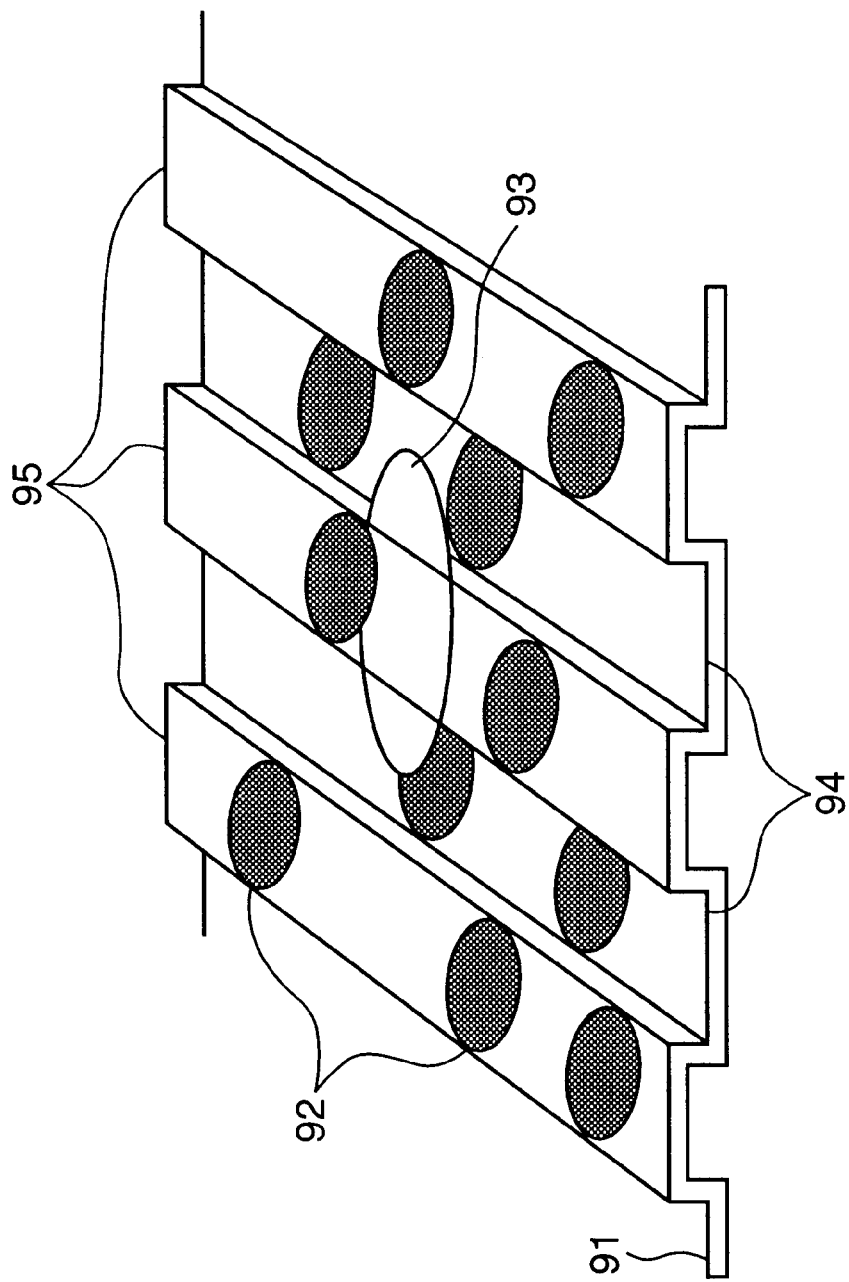
FIG. 3 is a diagram showing the structure of a conventional L/G record optical disk.
Figure 6A:
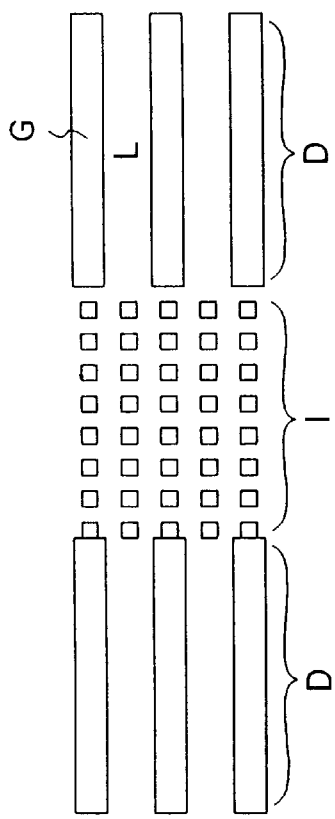
FIGS. 6A to 6C are diagrams showing the placement of the identification signal for conventional L/G recording optical disk.
Figure 6B:
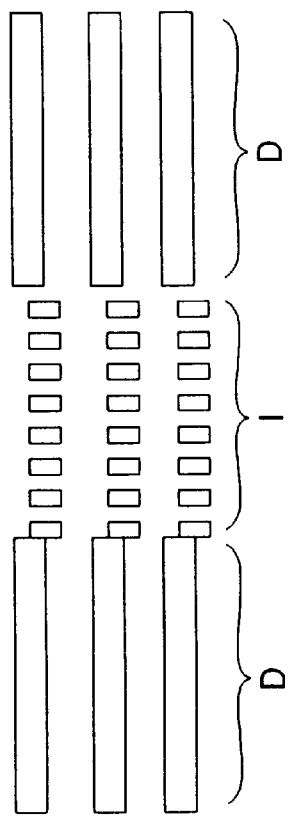
Figure 6C:
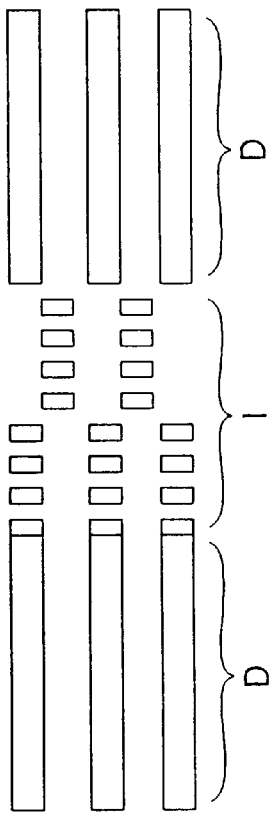

FIG. 1 and 2A show the preformatted ID placement on the optical disk and the position of the groove tracks and land tracks on the disk, according to an embodiment of the invention. In the track layout of this embodiment, identification signals are formed according to the land/groove shared address format of FIG. 6B, while the track format is that of the SS-L/G recording format of FIG. 4.

In the following description, the disk is assumed to be of the ZCLV format in which the optical disk is divided into multiple annular zones, and the number of sectors per revolution is greater in the more outer zones, so that the recording density is substantially uniform in all the zones, the rotational speed of the disk is switched from one zone to another, and, during data recording or reproduction, the data transfer rate and the linear velocity are substantially uniform in all the zones.

Figure 4A:
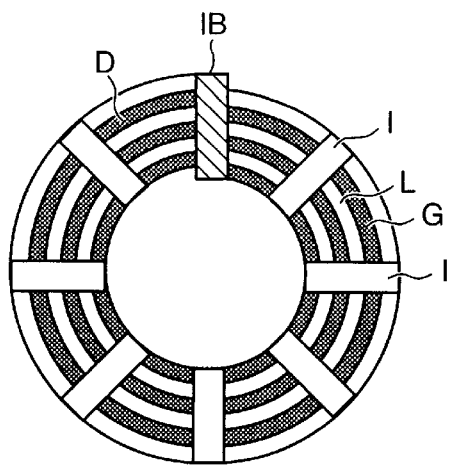
FIG. 4 is a diagram shoving the SS-L/G recording format.
Figure 4B:
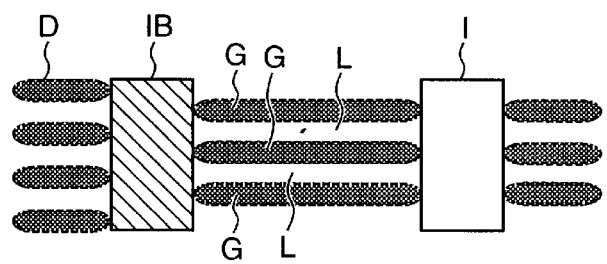
Figure 5A:
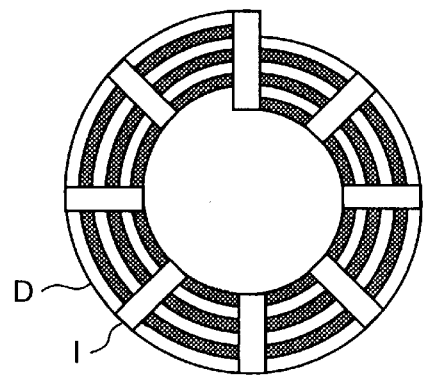
FIG. 5 is a diagram showing the DS-L/G recording format.
Figure 5B:
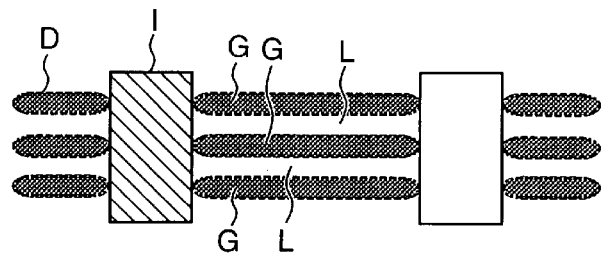

The optical disk shown in FIG. 1 is the same as that of FIG. 4, in that the preformatted ID regions I in all the tracks in each zone are aligned in the radial direction. Also, a connecting point, or a connecting point CP, between groove and land tracks, is provided every revolution, at one point, at the identification signal region IB. The land and groove tracks are connected at the connecting points CP to form a single recording spiral in which land and groove tracks alternate every revolution. As shown in FIG. 1 and FIG. 2A, each recording sector S is formed by an identification signal region I and information recording region D. The identification signal region I is placed at the beginning of the sector S, and is followed by the information recording region D. An identification signal is preformatted in each identification signal region.

The identification signal in the identification signal region is formed as prepits, being shifted or displaced by one-half track pitch (a track pitch being defined as the distance between the centers of the groove and land tracks adjacent to each other) toward the center of the disk, and hence on an extension of the boundary between the groove track and the land track adjacent to and inside of the above mentioned groove track. As a result, each identification signal is shared by adjacent groove and land tracks. Also, the direction of shift or displacement of the identification signal with respect to the preceding information recording region D is different between the sectors at the connecting point and other sectors, which are also called normal sector.

That is, as shown in FIG. 1, the identification signals in normal sectors (sectors which are not at a connecting point CP) are shifted inward relative to the information recording region D in the preceding recording sector S in the groove track G, and shifted outward relative to the information recording region D in the preceding recording sector S in the land track L. In contrast, the identification signal in sectors which are at a connecting point CP are shifted outward relative to the information recording region D in the preceding recording sector S in the groove track G, and shifted inward relative to the information recording region D in the preceding recording sector S in the land track L.

In other words, in a groove track formed of a sequence of groove track sectors, the identification signal positioned after each sector and associated with (e.g., indicating the address of) the following sector and the sector in the land track adjacent to and inside of the last-mentioned groove track, is shifted inward relative to the center of the groove track. At the end of the groove track, the identification signal following the last sector in the groove track is shifted outward. This identification signal is shared by the sector at the beginning of the land track following the groove track (i.e., connected to the above-mentioned groove track), and the sector at the beginning of the groove track adjacent to and outside of the last-mentioned land track.

Similarly, in a land track formed of a sequence of land track sectors, the identification signal positioned after each sector and associated with (e.g., indicating the address of) the following sector and the sector in the groove track adjacent to and outside of the last-mentioned land track, is shifted outward relative to the center of the land track. At the end of the land track, the identification signal following the last sector in the land track is shifted inward. This identification signal is shared by the sector at the beginning of the groove track following the land track (i.e., connected to the above-mentioned land track), and the sector at the beginning of the land track adjacent to and inside of the last-mentioned groove track.

Next, the tracking method for an optical disk preformatted with this type of identification signal is explained.

FIGS. 2A through 2E show the timing of operation of the tracking system and the ID detection, as the light beam passes over the identification signal region I at a land/groove border, and-the method of land/groove switching at a connecting point CP.

FIG. 2A shows recording sectors S of the same L/G track formed as that in FIG. 1, and the light beam LB scanning the track. The rotation of the disk in counterclockwise direction (as seen in FIG. 1 or FIG. 2A, in which the outer periphery of the disk is upward) means that the light beam scans from left to right on the track.

FIG. 2B shows the tracking error signal, FIG. 2C shows the control operation status of the tracking servo system, FIG. 2D shows the ID detection window signal, and FIG. 2E shows the identification signal read data.

Generally, tracking control is achieved by the push-pull method which is often used in optical disk devices. In this method, a tracking error signal is produced which is zero when a scanning light beam is following the center of a track (i.e., when the tracking error is zero), and its magnitude increases with the tracking error, i.e., the deviation of the light spot from the center of the track, with the polarity of the tracking error signal being dependent on the direction of the deviation.

Consideration will now be given to a light beam tracking a groove track, for example, in order to explain the operation when the light spot passes over the identification signal region, as shown in FIG. 2A. When the light spot is passing over an identification signal region at the head of a normal groove sector, prepits displaced towards the inside are being detected. A tracking error signal is obtained from the identification signal which indicates a maximum displacement towards the outside of the disk. On the other hand, just after the light spot moves from a groove to land track at a connecting point CP, prepits of the identification signal region at the head of a land sector displaced towards the outside is detected. A tracking error signal is obtained which indicates a maximum displacement towards the inside of the disk.

In this manner, when the light beam passes over the identification signal region, the tracking signal as shown in FIG. 2B is obtained. The chain lines TL1 and TL2 in FIG. 2B show the threshold level. Through the use of a window comparator, and based on the polarity of a tracking error signal having an amplitude exceeding the threshold level, a determination is made whether the identification signal is on the outside or inside, and hence whether the information recording region following the identification signal is in a land track or a groove track.

The tracking servo is generally so designed that its control frequency characteristic is low-pass type, and it scarcely responds to the tracking error over the length of the identification signal region (i.e., the light beam makes no appreciable amount of radial shift because of the tracking error), and the light beam keeps tracing the center of the track, i.e., the side edge part of the prepits forming the identification signal.

One practical method of overcoming disturbances to the tracking servo is to sample and hold the tracking error signal and causes the light beam to pass over the identification signal region through inertia while interrupting tracking control. FIG. 2C shows the operation of this tracking servo. The tracking servo polarity of the control system is so set that the light spot tracks the center of the groove in an information recording region in groove tracks and tracks center of the land of an information receding region in land tracks. The tracking control is stopped each time the light spot enters an identification signal region, and resumed each time the light spot enters an information recording region.

For reading the information from the identification signal region, the signal appearing periodically is detected by a timing signal, called ID detection window signal which is active or OPEN for a period when the identification signal is expected to appear, as shown in FIG. 2D. The period when the identification signal is expected to appear is predicted based on detection of the identification signal in the preceding sector. That is, the ID detection window signal is generated, through prediction and re-synchronization in accordance with the detected identification signal.

The SS-L/G recording optical disk uses the reflected light from the prepits to read the identification signal, just as for conventional optical disks. As shown in FIG. 2E, the identification signal is read out from the identification signal region of the disk and it includes the address information. According to this invention, in order to increase the reliability in the setting and switching of the tracking polarity for the SS-L/G format, the information (L/G track information) for the land/groove switch timing is contained in the identification signal of the recording sector before each connecting point. The information for the land/groove switch timing implies whether the following sector is at a connecting point or not, or the sector order toward the connecting point. The connecting point can thus be predicted based on the L/G track information in the identification signal region, with or without the detection of the polarity of the tracking error signal.

That is, the tracking polarity to be set in the tracking control system can be determined based on the appearance of the tracking error signal and its polarity. By using the information concerning the land/track switching timing in the identification signal, the method of detecting the tracking polarity can be multiplexed, and the reliability of the tracking servo system in having a correct polarity to be set can be enhanced.

The ID detection window signal can be used not only for the reading of the identification signal, as described above, but also for gating the tracking error signal, for the purpose of performing the error polarity detection. This in turn allows easy detection of the land/groove connecting point CP appearing once per revolution of the disk. This increases reliability of the tracking polarity setting and the tracking polarity switching for the SS-L/G recording format.

The above described configurations result in the ability of continuous recording or reproduction over the entire surface of the disk, without being interrupted by seeking operation between land and groove tracks. This allows motion picture recording and playback twice as long as that of conventional disk. Also, buffer memory is not required for seeking, thus lowering apparatus cost. Thus, this single spiral land/groove disk is suitable for implementation of data files as well as video files.

The method of detecting the identification signal and the track connecting point described above is just one example. Various modifications and/or combinations are possible without departing from the scope and spirits of the invention.

What is claimed is:

1. An optical disk comprising:
    a rotatable disk substrate;
    a plurality of single revolution groove tracks provided on said substrate;
    a plurality of single revolution land tracks provided on said substrate and alternately interspersed with said groove tracks;
    said groove tracks and land tracks being alternately connected after every revolution to form a single spiral of alternating land and groove tracks, each of said groove and land tracks being divided into plural sectors; and
    an identification signal identifying the beginning of each said sector, each said identifying signal being provided substantially between a said groove track and adjacent land track;
    said identifying signal for each sector being offset from a said groove or land track in the same manner as that in which said identifying signal for the preceding sector is offset, to signal the beginning of a normal sector, and in a manner different to that in which said identifying signal for the preceding sector is offset, to identify a sector occurring immediately after a change between a groove track and a land track.

2. The optical disk according to claim 1, wherein said disk is divided into a plurality of annular zones, the number of sectors per revolution being greater in the outer zones so that the recording density is substantially uniform in all the zones,
    wherein, during recording and reproduction, by changing the rotational speed between different zones, the transfer rate and linear velocity are made uniform in all the zones.

3. The optical disk according to claim 1, wherein said identification signal includes information concerning the timing for switching tracking polarity.

4. The optical disk according to claim 1, wherein said identifying signal for a sector is offset in the same direction as that of the identifying signal for the preceding sector to signal the beginning of a normal sector, and is offset in the direction opposite to that of identifying signal for the preceding sector to identify a sector occurring immediately after a groove/land or land/groove transition.

5. A method of tracking an optical disk having a track formed by groove tracks and land tracks between said groove tracks, both of which form an information recording region, said information recording region allowing an information signal to be recorded through illumination by a light beam and causing local change in the optical characteristics, said optical disk having groove and land tracks alternately connected after every revolution to form a single spiral of alternating land and groove tracks, each of said groove and land tracks being divided into plural sectors, an identification signal identifying the beginning of each said sector, each said identifying signal being provided substantially between a said groove track and adjacent land track, each said identifying signal for each sector being offset from a said groove or land track in the same direction as the direction in which said identifying signal for the preceding sector is offset to signal the beginning of a normal sector, and in the direction opposite to the direction in which said identifying signal for the preceding sector is offset to identify a sector occurring immediately after a change between a groove track and a land track, said method comprising the steps of:
  detecting the polarity of tracking error signal at said identification signal region of said recording sector; and
  determining whether or not said recording sector is at a connecting point between a groove track and a land track based on whether the polarity of tracking error signal at said recording sector is identical to the polarity of the tracking error signal at the immediately preceding recording sector.

6. The method according to claim 5, further comprising the step of gating said tracking error signal through the use of a window signal to detect the identification signal from said recording sector.

7. The method according to claim 5, wherein said step of detecting the polarity of tracking error of said recording sector includes the step of reading information concerning the timing for switching the tracking polarity.

8. The method according to claim 5, further comprising the steps of sampling and holding the tracking error signal just before the identification signal region of each recording sector;
  stopping the tracking control at said identification signal region; and
  resuming the tracking control at said information recording region.

9. The method according to claim 5 further comprising the steps of:
  reading information concerning the timing for switching the tracking polarity contained in the identification signal region; and
  switching the tracking polarity in accordance with said information thus read.

10. An optical disk comprising:
  a rotatable disk substrate;
  a plurality of single revolution groove tracks formed on said substrate, each groove track revolution being divided into a plurality of sectors;
  a plurality of single revolution land tracks provided on said substrate and alternately interspersed with said groove tracks, each land track revolution being divided into a plurality of sectors, said groove tracks and said land tracks being alternately connected after each revolution to form a single spiral of alternating land and groove track revolutions; and
  an identification region identifying the address of each sector, at least a portion of the identification region being formed as a plurality of pits which are each offset from the track center, the offset of the plurality of pits collectively forming an offset profile;
  wherein the offset profile for a sector at a transition between land and groove track revolutions is changed from the offset profile for the immediately preceding sector to identify a change between land and groove track revolutions.

11. The optical disk according to claim 10, wherein the offset profile for a sector which is not at a connection point between a land revolution and a groove revolution is the same as the offset profile for the immediately preceding sector.

* * * * *